Nov. 13, 1962 A. K. ANANDER 3,063,337
APPARATUS FOR HANDLING A CONTACT SCREEN
IN A PHOTOMECHANICAL CAMERA
Filed Oct. 7, 1957 2 Sheets-Sheet 1
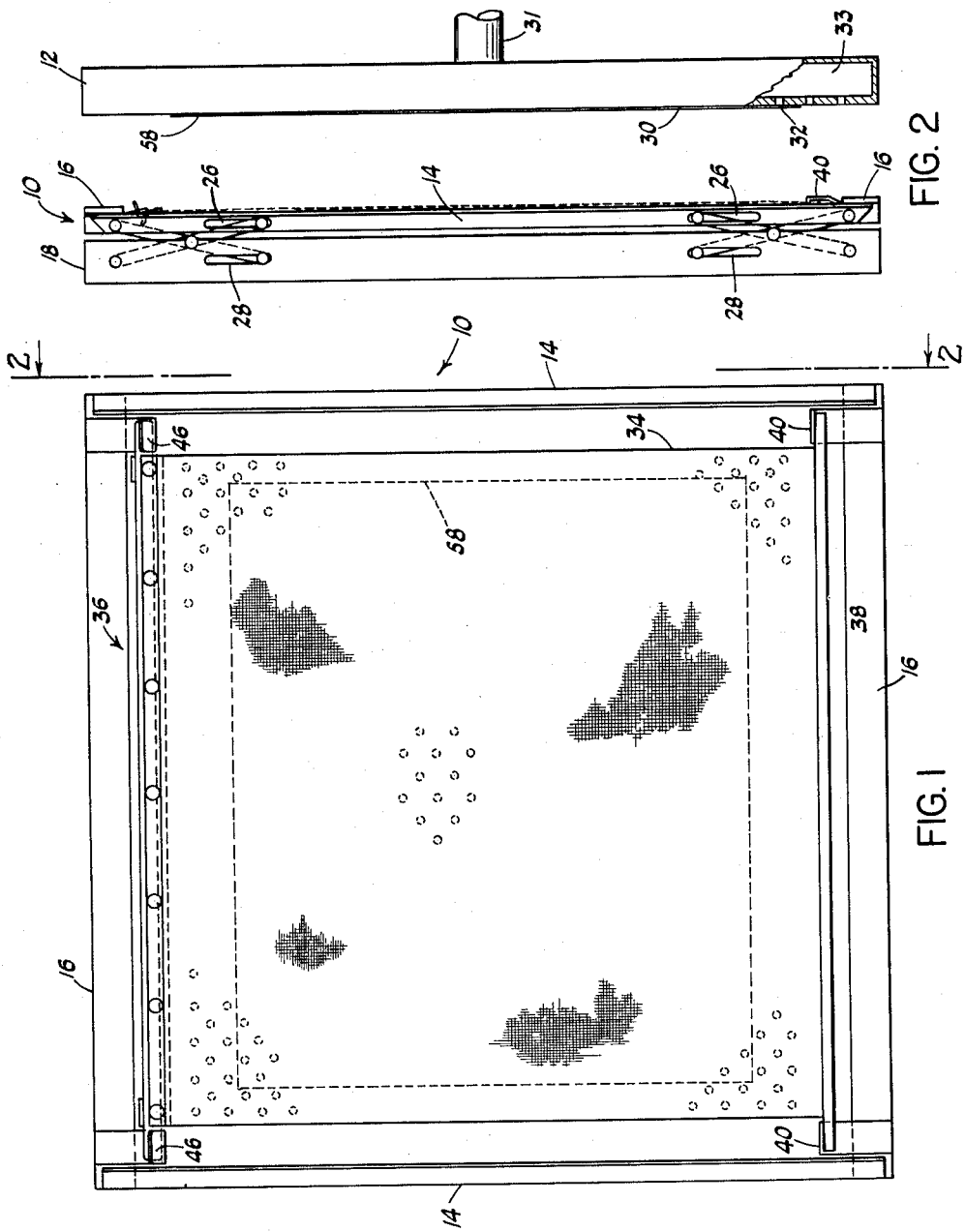
INVENTOR.
ANDREW K. ANANDER
BY
Morgan, Finnegan, Durham & Pine
ATTORNEYS Nov. 13, 1962   A. K. ANANDER   3,063,337
APPARATUS FOR HANDLING A CONTACT SCREEN
IN A PHOTOMECHANICAL CAMERA
Filed Oct. 7, 1957   2 Sheets-Sheet 2

*INVENTOR.*
ANDREW K. ANANDER
BY Morgan, Finnegan, Durham & Pine
ATTORNEYS

3,063,337
APPARATUS FOR HANDLING A CONTACT SCREEN IN A PHOTOMECHANICAL CAMERA
Andrew K. Anander, Glen Cove, N.Y., assignor to Powers Chemco, Inc., Glen Cove, N.Y., a body corporate of New York
Filed Oct. 7, 1957, Ser. No. 688,447
5 Claims. (Cl. 88—24)

This invention relates to the photomechanical art and has particular relation to apparatus for manipulating a contact type halftone screen employed in photomechanical cameras.

Objects and advantages of the invention will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

In the drawings:

FIGURE 1 is a vertical elevational view of a contact type halftone screen support frame constructed in accordance with the present invention and mounted in a photomechanical camera in front of the vacuum film support of the camera;

FIGURE 2 is a side elevational view of the contact type halftone screen support frame and the vacuum film support and is taken generally from line 2—2 of FIGURE 1 and shows the screen support frame in position well spaced from the film support, with a portion of the film support being broken away to show the construction thereof;

Figure 3:
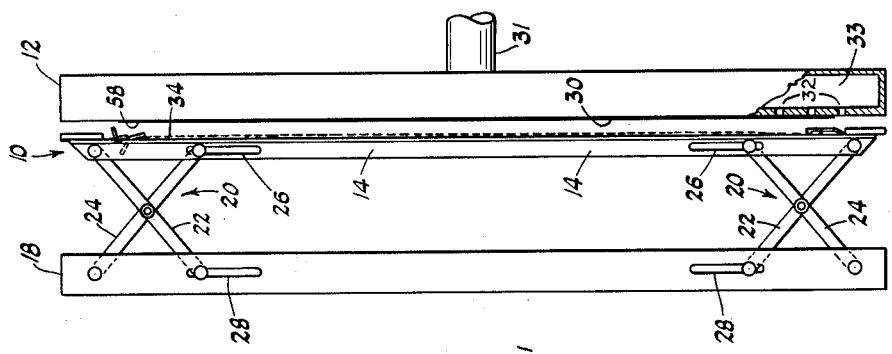
FIGURE 3 is a view similar to that of FIGURE 2 only with the screen support frame moved toward the film support to a position immediately prior to where the laterally extending fingers of the support hanger engage the face of the film support.

The invention has for its object an improved apparatus for handling a contact type halftone screen in a photomechanical camera and assembling it in proper relation with the film. Another object is to provide an improved apparatus for moving a contact type halftone screen into overlying relation with a film against a vacuum film support. A further object is to provide such an improved apparatus wherein as the screen is brought toward the vacuum support the upper portion of the screen is flexed or rocked into contact with the support and the remainder of the screen is progressively sucked into overlying relation with the film support downwardly from this contacting upper portion thereby providing a smooth overlay of the screen on the film and film support. Another object is to provide such a screen handling apparatus which is movable toward and from the film support and wherein the screen is hung from its upper end and the support is automatically operative in response to approaching the support to flex the upper portion of the screen toward the support. Another object is to provide such an apparatus wherein the screen is hung from a pivotally mounted member that is automatically rocked about its axis as it approaches the film support. Another object is to provide such apparatus which is simple and economic yet highly reliable in its operation of providing a smooth overlay of the contact screen on the film.

In accordance with the present invention there is provided in a photomechanical camera a support frame for a contact type halftone screen with the frame being positioned in front of a vacuum type film support or backing member. The screen support frame is mounted in the camera so that it may be moved toward and away from the film backing member to permit the frame being spaced from the face of the backing member in order that film may be placed against this face after which the frame may be moved to a position adjacent the backing member so that the screen will be positioned in overlying contact relation with the film during exposure. The backing member or film support is of the suction type and accordingly has a plurality of openings distributed over its face through which suction is applied to draw the film against the face of backing member and hold it there and also to draw the contact screen into flat overlying contact relation with the film and the backing member. The screen, which is larger in area than the film, is hung from its upper end from a support hanger or bar which forms a part of the screen support frame. This support hanger is carried by the frame in a manner that permits it to be rocked in a way which flexes the screen and moves the upper portion of the screen toward the backing member and into overlying relation with the film and face of the backing member generally across the width of the screen. This rocking of the support hanger and consequent flexing of the screen is automatically accomplished incident to moving the support frame toward the backing member and into adjacent relation with it and for this purpose the support hanger is provided with a portion or portions, in the nature of ears, extending toward the backing member and which engage the face of the backing member as the frame approaches it and prior to the frame reaching its final position adjacent the backing member. When these portions of the support hanger contact the backing member further movement of the frame toward the backing members rocks the support hanger in the manner mentioned, flexing the screen so that the upper portion thereof is moved toward the backing member and into engagement with it when the support frame reaches its final position adjacent the backing member. When the upper portion of the screen initially contacts the backing member the rest of the screen below this upper portion is spaced from the backing member. However, since the screen extends well beyond the edges of the film the suction applied through the openings in the backing member surrounding the film and underlying the screen is effective to draw the screen into flat overlying relation with the film and face of the backing member from the upper portion of the screen progressively downward throughout the length of the screen with this progressive flattening of the screen against the film and backing member insuring against there being any trapped air pockets or wrinkling of the screen. After exposure of the film, the suction that was applied through the backing member is released with the screen, below the upper portion, falling away from the backing member and film and the film dropping downward from the backing member. Thereafter the screen is moved away from the backing member preparatory to placing another film sheet in place thereagainst.

It will be understood that the foregoing general description and the following detailed description as well are exemplary and explanatory of the invention but are not restrictive thereof.

Referring now to the drawings, wherein like reference characters are used throughout to designate like elements, the preferred and illustrative embodiment of the invention depicted therein comprises a contact screen support frame generally designated 10 and mounted in a vertical position in a photomechanical camera in front of a vacuum type film support 12. The screen support frame 10 is comprised of a pair of spaced upright structural angle members 14, preferably of steel, connected at their ends in any suitable manner such as by welding to the vertically spaced horizontally disposed structural members 16. This frame is mounted on or supported by the camera frame in any suitable manner which will permit it to move toward and away from the film support or backing member 12 while retaining it in parallel relation with this backing member. As shown, support frame 10 is mounted on the camera frame, a portion of which is shown and identified as 18, by means of an expansible type linkage 20 interconnected with the upper and lower ends of each of the upright angle members 14. This linkage comprises a pair of links or connecting members 22 and 24 pivotally connected to each other generally at their center with link 24 being pivotally connected to camera frame 18 at one end and having its other end slidably received within a vertically elongated slot 26 in member 14 and with link 22 having one end pivotally connected to member 14 and the other end slidably received within vertically elongated slot 28 in camera frame 18. With this support mechanism the contact screen support frame 10 may be moved horizontally toward and away from the film support 12 and this movement may be accomplished by manual manipulation or suitable mechanical or motorized actuators may be provided for thus moving the screen support.

Film, such as sheet 58, is retained against the front face 30 of film support 12 with it being essential that the film is in flat overlying relation with the film support throughout the area of the film. To accomplish this, film support 12 is of the vacuum type, such as disclosed in my U.S. Patent 2,694,337 issued Nov. 16, 1954, and in such a film support the face of the support has openings 32 distributed generally uniformly throughout its area and through which suction is applied by means of the manifold 33 which is in turn in communication with a source of suction such as a vacuum pump through conduit 31. With this arrangement the film is sucked into flat overlying relation with the face 30 of film support 12.

Figures 8, 9, 10:
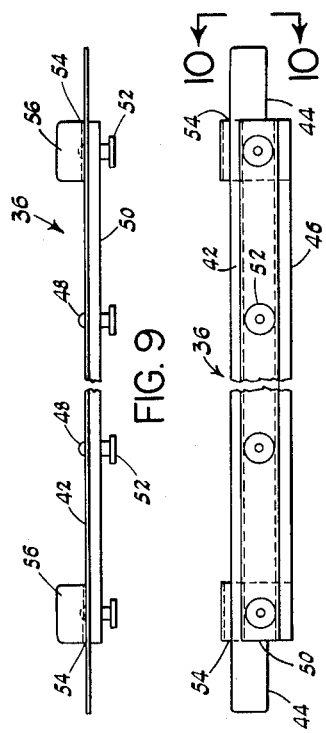
FIGURE 8 is a vertical elevational view of the screen support hanger or bar per se which forms part of the screen support frame and from which the screen hangs.
FIGURE 9 is a top view of the support hanger of FIGURE 8.
FIGURE 10 is an end view taken from line 10—10 of FIGURE 6.

Supported in frame 10 is the flexible contact type halftone screen 34. This screen is secured at its upper end to and hung from the support hanger or rod 36 which forms a part of frame 10 with the lower end of the screen being clamped to the horizontal bar 38 which has its ends loosely received beneath the rearwardly extending horizontal upper end of the brackets 40 secured to the lower structural member 16. The support hanger 36 is comprised, as particularly shown in FIGURES 8, 9 and 10, of the relatively flat strip 42 which has the lower portion of its ends relieved so as to provide an offset bearing edge 44 at each end, which edge is received in and engages the brackets 46 that are secured to and extend downwardly from the upper structural member 16. These brackets have their lower extremity bent back and upward (FIGS. 6 and 7) thereby forming a V or crotch within which the extremities of strip 42 are received and which the edges 44 engage. With this mounting of strip 42 the strip and accordingly support hanger 36 may be rocket or pivoted about the support edges 44 and since these edges are offset from the lower edge or portion 46 of the strip this lower edge will move toward and away from the face 30 of film support 12 as a result of such rocking movement. The strip 42 is provided with studs 48 which are welded to the strip and extend rearwardly from the strip away from the film support. Received over these studs is the channel member 50 which is provided with suitable openings in its web portion through which the studs extend with thumb nuts 52 being received on the outer end of the studs and operative to securely clamp the channel 50 to strip 42. The upper end of screen 34 is positioned between the lower edge of the channel and the face of strip 42 and is securely clamped therebetween upon tightening nuts 52 so that the screen hangs from support hanger 36. Also secured to strip 42 are the pair of horizontally spaced brackets 54 with these brackets being conveniently secured in place by welding to bar 42. Each of the brackets is provided with a laterally extending portion 56 directed toward the film support 12 and positioned well above the edge 44 with this laterally extending portion in effect providing an ear extending from the upper portion of strip 42 toward the film support 12.

Figure 4:
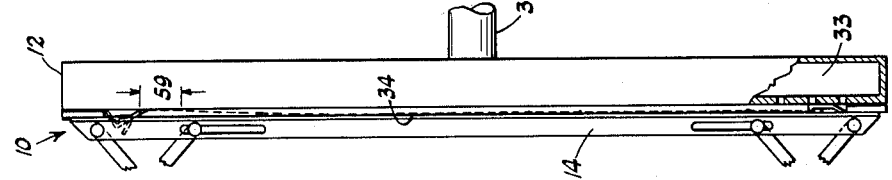
FIGURE 4 is a view similar to that of FIGURE 3 but with the screen support frame moved to its closest position with relation to the film support and showing the screen in its initially flexed position in engagement with the face of the film support but before it has been sucked into flat overlying relation with the film and the film support.
Figure 5:
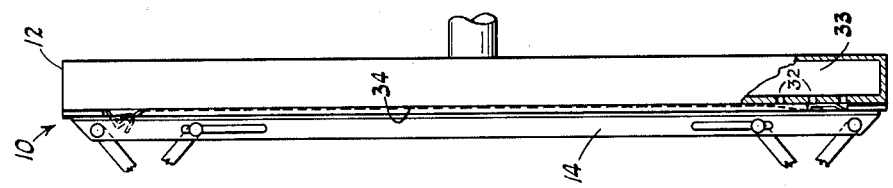
FIGURE 5 is a view similar to that of FIGURE 4 but showing the screen in flat overlying relation with the film and film support.
Figures 6, 7:
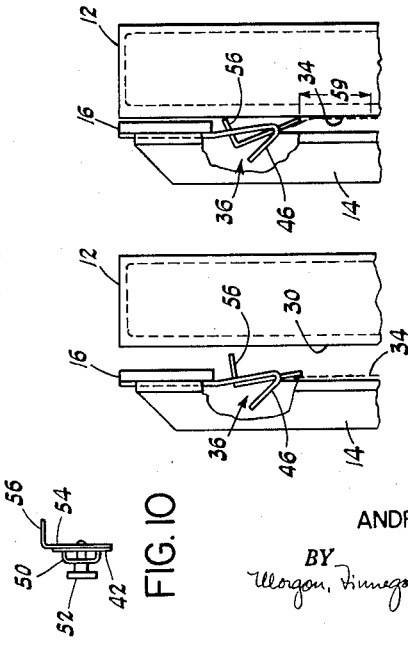
FIGURE 6 is an enlarged end view of the support hanger disposed in its mounting bracket and shown in its normal position prior to engagement with the film support.
FIGURE 7 is a view similar to FIGURE 6 but showing the support hanger in its rocked or pivoted position which it occupies when the support frame is moved to its innermost or nearest position to the film support.

In operation, contact screen support frame 10 is moved to its position shown in FIGURE 2, where it is well spaced from the face 30 of film support 12, during the positioning of a new sheet of film in overlying relation with the face of the support with the film preferably being fed from a roll positioned above the film support and in a manner such as disclosed in U.S. Patent 2,287,271 issued June 23, 1942 to F. T. Powers. This sheet of film, indicated in dotted lines in FIGURE 1 and identified as 58, is substantially smaller than screen 34, as shown, and is supported in position in front of the vacuum film support 12 generally in spaced relation with the face of this support after which vacuum is applied to the film support or backing member drawing the film into flat overlying relation with the face 30 of this member. Thereafter contact screen support frame 10 is moved by manual manipulation or any other desired manner toward film support 12 with FIGURE 3 showing the screen support frame in its position immediately prior to engagement of the laterally extending ears 56 with the face 30 of the film support and with FIGURE 6 showing the normal disposition of the support hanger 36 prior to engagement of these ears with the film support and where strip 42 occupies a generally vertical position. Upon further movement of the support frame 10 toward film support 12 ears 56 engage the face 30 of the support frame rocking or pivoting the support hanger 36 about the edges 44 causing the lower portion of the support hanger to move toward the face 30 of the film support with FIGURES 4, 5 and 7 showing the support hanger in its pivoted or rocked position and the support frame 10 in its extreme position adjacent the film support.

This pivoting of support hanger 36 flexes or bends the upper portion of contact halftone screen 34 so that the upper portion of the screen is initially brought into contact with the film strip 58 and the surface 30 of the film support with this upper portion comprising a relatively small region of the screen such as the vertical extent 59 extending across the width of the screen. FIGURE 4 shows the screen 34 in its initially flexed position resulting from the rocking of the support hanger 36 and where this upper portion only of the screen is brought into contact with surface 30 of film support 12 and the film sheet. Initially, the remainder of the screen 34 below this upper portion in engagement with the film support and film sheet is spaced a slight distance from the support. However, the suction applied through the openings or ports 32 surrounding or lying outwardly of film sheet 58 and underlying the screen 34 is effective to pull out the air between the marginal portion of the screen and then between the film sheet and the screen with this being a progressive action downwardly from the upper portion of the screen that is in contact overlying relation with the film support and the film so that the screen is brought into flat overlying relation with the film support and the film progressively downward from this upper portion with FIGURE 5 showing the screen in position against the film and film support. This has the effect of insuring that the flexible screen is free of wrinkles and air pockets and is in true, flat overlying relation with the film which is of course essential for proper film exposure. As the screen is progressively brought toward and into engagement with the film support the suction or vacuum at the points of contact of the screen with the backing member is progressively increased.

Upon thus positioning the screen in place exposure of the film may be made and after exposure the application of vacuum to the film support is terminated which results in the lower portion of the screen, or the portion below the upper portion of the screen that is flexed into engagement with the film support, falling away from the film and film support so that the film drops from the surface of the film support. Thereafter the contact screen support frame is moved away from the film support to its extreme position as shown in FIGURE 1 in order that a new sheet of film may be positioned in front of the film support and the operation repeated.

With the apparatus of this invention proper engagement of the contact screen in overlying relation with the film is provided in a simple yet extremely effective manner.

The invention in its broader aspects is not limited to the specific mechanism shown and described but departures may be made therefrom, within the scope of the accompanying claims, without departing from the principles of the invention and without sacrificing its chief advantages.

I claim:
1. Apparatus for making contact screen exposures on film comprising an upright vacuum backing member for holding a sheet of film in exposure position, a frame linearly movable towards and from the backing member for holding a flexible contact screen adjacent the film support, with the screen hanging freely from the frame and including means operative to flex the screen near its upper end in response to the approach of the frame and screen towards the backing member whereby the portion of the screen below the flexed portion is further urged toward the backing member and is sucked theretowards into engagement with the backing member and sheet of film supported thereon.

2. In a photomechanical camera the combination of an upright vacuum backing member for holding the film, a contact screen support frame positioned in front of said backing member and linearly movable to and from a position well spaced from said backing member and a position juxtaposed to said backing member, said frame including a support bar extending across the upper region of the frame and having a flexible screen hanging therefrom, said bar being disposed in parallel relation with the backing member when the frame is juxtaposed thereto and mounted on the frame for pivotal movement about an axis also parallel with said backing member when the frame is juxtaposed thereto, and means responsive to moving the frame to its position juxtaposed to the backing member to pivot said bar about said axis to move the upper portion of said screen toward and into initial contact with said backing member in advance of the overall application of said screen to said backing member.

3. The combination of claim 2 wherein the means for effecting pivotal movement of the bar in response to the frame being moved into juxtaposition to the backing member includes means on the bar extending laterally thereof and adapted to engage the backing member as the frame approaches the same.

4. Apparatus for making contact screen exposures on film comprising an upright vacuum backing member for holding the film in exposure position, a frame movable towards and from the backing member for holding a flexible contact screen adjacent the film support, said frame including a horizontal support bar parallel with the backing member and mounted for rocking movement about a horizontal axis disposed above the lower portion of the bar, said bar including means for engaging the upper end of the screen across its width so the screen hangs from the support bar and moves with the lower portion of the bar, and said bar including a laterally extending portion extending toward the backing member for engagement therewith as the frame is moved toward said member and operative upon engaging said member to rock the bar to move the lower portion thereof toward said member.

5. In an organization of the type described the combination of a vacuum film support having a vertically disposed flat face against which a film sheet is held by suction for exposure, a frame in front of said film support for supporting a flexible contact type optical screen having an area larger than the film sheet for producing halftones with the frame being in generally parallel relation with said face and movable to and from said face so that the screen may be well spaced from the support or may be juxtaposed thereto where it will be sucked into overlying relation with said face of the film support, said frame including a horizontally disposed support hanger for the flexible screen and which comprises a support strip mounted in a pair of spaced brackets in a manner providing for rocking movement of the strip about a horizontal axis intermediate its vertical extremities with the strip being normally disposed so its median plane is generally vertical, means extending laterally from said strip toward the face of the film support above said axis and engaging said face as the frame is moved toward it to rock said strip about said axis and move the lower portion thereof toward said face, and means for releasably securing the upper end of the flexible screen to said strip so it hangs therefrom and so the upper portion of the screen is moved toward and into contact with the face of the film support in response to rocking of the strip so that the screen will be progressively drawn into smooth overlying relation with said face from this upper portion.

References Cited in the file of this patent
UNITED STATES PATENTS

| | | |
|---|---|---|
| 2,000,390 | Huebner | May 7, 1935 |
| 2,652,757 | Robbins | Sept. 22, 1953 |
| 2,694,337 | Anander | Nov. 16, 1954 |
| 2,774,289 | Collins | Dec. 18, 1956 |
| 2,799,204 | Blatherwick | July 16, 1957 |
| 2,814,233 | Anander | Nov. 26, 1957 |
| 2,826,976 | Gelb | Mar. 18, 1958 |

FOREIGN PATENTS

| | | |
|---|---|---|
| 186,523 | Austria | Aug. 25, 1956 |